(12) United States Patent
Okada et al.

(10) Patent No.: US 11,975,974 B2
(45) Date of Patent: May 7, 2024

(54) ACTIVATED CARBON FIBER, ACTIVATED CARBON FIBER FORMED BODY, AND METHOD FOR PRODUCING THEREOF, ORGANIC SOLVENT ADSORPTION/DESORPTION DEVICE, ORGANIC SOLVENT RECOVERY SYSTEM, METHOD FOR ADSORBING/DESORBING ORGANIC SOLVENT, AND METHOD FOR RECOVERING ORGANIC SOLVENT

(71) Applicant: TOYOBO MC CORPORATION, Osaka (JP)

(72) Inventors: Takemasa Okada, Otsu (JP); Akifumi Yasui, Otsu (JP); Kenta Hojo, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 0 days.

(21) Appl. No.: 18/283,321

(22) PCT Filed: Mar. 10, 2022

(86) PCT No.: PCT/JP2022/010667
§ 371 (c)(1),
(2) Date: Sep. 21, 2023

(87) PCT Pub. No.: WO2022/202375
PCT Pub. Date: Sep. 29, 2022

(65) Prior Publication Data
US 2024/0101429 A1    Mar. 28, 2024

(30) Foreign Application Priority Data

Mar. 23, 2021 (JP) ................................ 2021-048767
Mar. 30, 2021 (JP) ................................ 2021-057459

(51) Int. Cl.
*B01D 53/02* (2006.01)
*B01D 53/04* (2006.01)
(Continued)

(52) U.S. Cl.
CPC ............ *C01B 32/318* (2017.08); *B01D 53/04* (2013.01); *B01J 20/20* (2013.01);
(Continued)

(58) Field of Classification Search
CPC ................. C01B 32/318; B01D 53/04; B01D 2253/102; B01D 2257/70;
(Continued)

(56) References Cited

U.S. PATENT DOCUMENTS 6,841,629 B1    1/2005  Maeda et al.
2003/0161781 A1    8/2003  Cabasso et al.
(Continued)

FOREIGN PATENT DOCUMENTS

CN    109775707 A    *  5/2019
JP    2000-281893 A       10/2000
(Continued)

OTHER PUBLICATIONS

Translation of CN-109775707-A; Yuan D (Year: 2019).*
(Continued)

*Primary Examiner* — Christopher P Jones
(74) *Attorney, Agent, or Firm* — WHDA, LLP (57) ABSTRACT

An activated carbon fiber is obtained by activating: a polyphenylene ether fiber that contains a polyphenylene ether component having a rearrangement structure connected by a bond at an ortho-position in a repeating unit continuously bonded at a para-position; an infusibilized polyphenylene ether fiber obtained by infusibilizing the polyphenylene ether fiber; a flameproofed polyphenylene ether fiber obtained by flameproofing the polyphenylene ether fiber or (Continued)

the infusibilized polyphenylene ether fiber; or a carbon fiber obtained by carbonizing any of the polyphenylene ether fibers.

20 Claims, 1 Drawing Sheet

(51) Int. Cl.

| | | |
|---|---|---|
| *B01J 20/20* | (2006.01) | |
| *B01J 20/28* | (2006.01) | |
| *B01J 20/30* | (2006.01) | |
| *C01B 32/318* | (2017.01) | |
| *D01F 9/24* | (2006.01) | |
| *D04H 1/4242* | (2012.01) | |
| *D04H 1/4326* | (2012.01) | |
| *D04H 1/46* | (2012.01) | |
| *D04H 3/002* | (2012.01) | |
| *D04H 3/009* | (2012.01) | |
| *D04H 3/105* | (2012.01) | |
| *D06C 7/04* | (2006.01) | |

(52) U.S. Cl.
CPC ..... *B01J 20/28023* (2013.01); *B01J 20/3078* (2013.01); *D01F 9/24* (2013.01); *D04H 1/4242* (2013.01); *D04H 1/4326* (2013.01); *D04H 1/46* (2013.01); *D04H 3/002* (2013.01); *D04H 3/009* (2013.01); *D04H 3/105* (2013.01); *D06C 7/04* (2013.01); *B01D 2253/102* (2013.01); *B01D 2257/70* (2013.01); *B01D 2259/4009* (2013.01); *D10B 2331/06* (2013.01); *D10B 2505/00* (2013.01)

(58) Field of Classification Search
CPC .............. B01D 2259/4009; B01J 20/20; B01J 20/28023; B01J 20/3078; D01F 9/24; D04H 1/4242; D04H 1/4326; D04H 1/46; D04H 3/002; D04H 3/009; D04H 3/105; D06C 7/04; D10B 2331/06; D10B 2505/00
See application file for complete search history.

(56) References Cited

U.S. PATENT DOCUMENTS

| 2015/0166789 A1 | 6/2015 | Hossan et al. |
| 2023/0173456 A1 | 6/2023 | Okada et al. |

FOREIGN PATENT DOCUMENTS

| JP | 2003-160662 A | 6/2003 |
| JP | 2011-106051 A | 6/2011 |
| JP | 2012-52283 A | 3/2012 |
| JP | 2016-193412 A | 11/2016 |
| JP | 2018-058983 A | 4/2018 |
| JP | 3229841 U | 12/2020 |
| WO | 2021/200223 A1 | 10/2021 |

OTHER PUBLICATIONS

Written Opinion of the International Searching Authority (Form PCT/ISA/237) dated May 10, 2022, issued in counterpart International Application No. PCT/JP2022/010667, with English Translation. (8 pages).
International Search Report dated May 10, 2022, issued in counterpart International Application No. PCT/JP2022/010667, with English Translation. (5 pages).
Notice of Reasons for Refusal dated Aug. 19, 2022, issued in counterpart of Japanese Patent Application No. 2022-545424, with English Translation. (6 pages).
Notice of Reasons for Refusal dated Oct. 4, 2022, issued in counterpart of Japanese Patent Application No. 2022-545424, with English Translation. (6 pages).
Notice of Reasons for Refusal dated Dec. 27, 2022, issued in counterpart of Japanese Patent Application No. 2022-545424, with English Translation. (10 pages).
Written Opinion of the International Searching Authority (Form PCT/ISA/237) dated May 10, 2022, issued in counterpart International Application No. PCT/JP2022/010667. (4 pages).
Office Action dated Jan. 16, 2024, issued in counterpart CN application No. 202280021601.3, with English translation. (19 pages).
Office Action dated Feb. 13, 2024, issued in counterpart KR application No. 10-2023-7029136, with English translation. (7 pages).

* cited by examiner

ACTIVATED CARBON FIBER, ACTIVATED CARBON FIBER FORMED BODY, AND METHOD FOR PRODUCING THEREOF, ORGANIC SOLVENT ADSORPTION/DESORPTION DEVICE, ORGANIC SOLVENT RECOVERY SYSTEM, METHOD FOR ADSORBING/DESORBING ORGANIC SOLVENT, AND METHOD FOR RECOVERING ORGANIC SOLVENT

DESCRIPTION

Technical Field

The present invention relates to an activated carbon fiber, an activated carbon fiber formed body, and a method for producing thereof, an organic solvent adsorption/desorption device, an organic solvent recovery system, a method for adsorbing/desorbing an organic solvent, and a method for recovering an organic solvent.

Background Art

A phenolic fiber is excellent in heat resistance, flame retardancy, and chemical resistance, and therefore is used in a wide range of fields including industrial material fields. A Phenolic activated carbon fiber obtained by carbonizing and activating the phenolic fiber is used as functional materials in specific fields, and is specifically used in organic solvent recovery systems. In detail, the phenolic activated carbon fiber is used in adsorbents for adsorbing and desorbing organic solvents, and the like.

The phenolic fiber (novoloid fiber) is generally manufactured by melt-spinning a novolac-type phenolic resin, and then reacting the melt-spun novolac-type phenolic resin with aldehydes under an acidic catalyst to three-dimensionally crosslink and infusibilize the novolac-type phenolic resin.

Patent Document 1 proposes a method for manufacturing a phenolic carbon fiber, characterized by carbonizing a phenolic fiber manufactured by a method for manufacturing a phenolic fiber including a raw material mixing step of mixing a phenolic resin and a fatty acid amide and a spinning step of spinning a raw material mixture obtained in the raw material mixing step to obtain a yarn, and a method for manufacturing a phenolic activated carbon fiber, characterized by activating the phenolic carbon fiber manufactured by the method.

PRIOR ART DOCUMENTS

Patent Documents

Patent Document 1: JP-A-2012-52283

SUMMARY OF THE INVENTION

Problems to be Solved by the Invention

The phenolic fiber is a useful substance as a precursor of an activated carbon fiber, but harmful aldehydes are used in the manufacture of the phenolic fiber. There is a problem that the use of the aldehydes adversely affects the human body and the environment. Therefore, development of a new precursor to replace the phenolic fiber is required.

When the phenolic activated carbon fiber is used for applications such as an adsorbent, the phenolic activated carbon fiber having a large fiber diameter (increased diameter) is required in order to reduce the pressure loss. However, the phenolic fiber cured (infusibilized by three-dimensional crosslinking) using aldehydes is poor in flexibility, and extremely brittle. Therefore, when the diameter of the phenolic fiber is increased, mechanical strength (in particular, fiber strength and fiber elongation) required for producing or spinning a woven fabric, a nonwoven fabric, or a felt or the like is insufficient, which causes deteriorated processability. Even if a woven fabric, a nonwoven fabric, or a felt or the like can be produced or spun, there is a problem that the phenolic activated carbon fiber obtained by carbonizing and activating the woven fabric, the nonwoven fabric, and the felt is insufficient in mechanical strength (particularly tensile strength) required as the functional materials.

In Patent Document 1, the fatty acid amide is mixed with the phenolic resin in order to improve the mechanical strength when the diameter of the phenolic fiber is increased.

However, the phenolic fiber containing the fatty acid amide has a problem that harmful decomposition gases such as HCN and NOx are generated in a process of burning decomposition gases generated during a carbonization treatment or an activation treatment.

An object of the present invention is to provide an activated carbon fiber that is excellent in heat resistance, excellent in mechanical strength and processability even when the diameter of the activated carbon fiber is increased, and does not generate a harmful decomposition gas during production, an activated carbon fiber formed body containing the activated carbon fiber, a method for producing an activated carbon fiber, a method for producing an activated carbon fiber formed body, an organic solvent adsorption/desorption device including the activated carbon fiber formed body, a method for adsorbing/desorbing an organic solvent, an organic solvent recovery system including the organic solvent adsorption/desorption device, and a method for recovering an organic solvent.

Means for Solving the Problems

As a result of intensive studies, the present inventors have found that the above problems can be solved by using a polyphenylene ether fiber containing a polyphenylene ether component having a specific rearrangement structure, an infusibilized polyphenylene ether fiber obtained by infusibilizing the polyphenylene ether fiber, a flameproofed polyphenylene ether fiber obtained by flameproofing the polyphenylene ether fiber or the infusibilized polyphenylene ether fiber, or a carbon fiber obtained by carbonizing any of the polyphenylene ether fibers as a precursor of an activated carbon fiber, and have completed the present invention.

That is, the present invention relates to an activated carbon fiber obtained by activating:

a polyphenylene ether fiber that contains a polyphenylene ether component having a rearrangement structure connected by a bond at an ortho-position in a repeating unit continuously bonded at a para-position;

an infusibilized polyphenylene ether fiber obtained by infusibilizing the polyphenylene ether fiber;

a flameproofed polyphenylene ether fiber obtained by flameproofing the polyphenylene ether fiber or the infusibilized polyphenylene ether fiber; or a carbon fiber obtained by carbonizing any of the polyphenylene ether fibers.

In the activated carbon fiber of the present invention, the repeating unit continuously bonded at a para-position is preferably represented by the following general formula (1):

[Formula 1]

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent; and
the rearrangement structure is preferably represented by the following general formula (2):

[Formula 2]

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3\prime}$ represents a divalent group in which one hydrogen atom is removed from $R^3$.

In the activated carbon fiber of the present invention, an amount of rearrangement in the polyphenylene ether component having the rearrangement structure is preferably 0.01 mol% or more with respect to all polyphenylene ether structural units in the polyphenylene ether component.

In the activated carbon fiber of the present invention, a content of the polyphenylene ether component is preferably 95% by mass or more in the polyphenylene ether fiber.

In the activated carbon fiber of the present invention, the rearrangement structure preferably exhibits peaks in a range of 6.8 to 7.0 ppm and a range of 3.8 to 4.0 ppm in nuclear magnetic resonance spectrum ($^1$H-NMR) measurement.

In the activated carbon fiber of the present invention, an amount of radicals in the polyphenylene ether fiber is preferably 50 g$^{-1}$ or more.

In the activated carbon fiber of the present invention, the polyphenylene ether fiber preferably has a glass transition temperature of 190° C. or higher and 210° C. or lower.

The activated carbon fiber of the present invention preferably has a fiber diameter of 10 μm or more and 100 μm or less.

The activated carbon fiber of the present invention preferably has a BET specific surface area of 500 m²/g or more and 2500 m²/g or less.

The present invention also relates to an activated carbon fiber formed body comprising the activated carbon fiber of the present invention.

The activated carbon fiber formed body of the present invention is preferably an activated carbon fiber nonwoven fabric.

In the activated carbon fiber formed body of the present invention, the activated carbon fiber nonwoven fabric preferably has tensile strength of 4 N/cm² or more.

In the activated carbon fiber formed body of the present invention, the activated carbon fiber nonwoven fabric is preferably a short fiber nonwoven fabric or a long fiber nonwoven fabric.

The present invention also relates to a method for producing an activated carbon fiber of the present invention, comprising the steps of:
  producing a polyphenylene ether fiber that contains a polyphenylene ether component having a rearrangement structure connected by a bond at an ortho-position in a repeating unit continuously bonded at a para-position; and
  activating the polyphenylene ether fiber.

The method for producing an activated carbon fiber of the present invention preferably further comprises the step of carbonizing the polyphenylene ether fiber before the activation step.

The present invention also relates to a method for producing an activated carbon fiber of the present invention, comprising the steps of:
  producing a polyphenylene ether fiber that contains a polyphenylene ether component having a rearrangement structure connected by a bond at an ortho-position in a repeating unit continuously bonded at a para-position;
  infusibilizing the polyphenylene ether fiber to produce an infusibilized polyphenylene ether fiber; and
  activating the infusibilized polyphenylene ether fiber.

The method for producing an activated carbon fiber of the present invention preferably further comprises the step of carbonizing the infusibilized polyphenylene ether fiber before the activation step.

The present invention also relates to a method for producing an activated carbon fiber of the present invention, comprising the steps of:
  producing a polyphenylene ether fiber that contains a polyphenylene ether component having a rearrangement structure connected by a bond at an ortho-position in a repeating unit continuously bonded at a para-position;
  flameproofing the polyphenylene ether fiber to produce a flameproofed polyphenylene ether fiber; and
  activating the flameproofed polyphenylene ether fiber.

The present invention also relates to a method for producing an activated carbon fiber of the present invention, comprising the steps of:
  producing a polyphenylene ether fiber that contains a polyphenylene ether component having a rearrangement structure connected by a bond at an ortho-position in a repeating unit continuously bonded at a para-position;
  infusibilizing the polyphenylene ether fiber to produce an infusibilized polyphenylene ether fiber;

flameproofing the infusibilized polyphenylene ether fiber to produce a flameproofed polyphenylene ether fiber; and activating the flameproofed polyphenylene ether fiber.

The method for producing an activated carbon fiber of the present invention preferably further comprises the step of carbonizing the flameproofed polyphenylene ether fiber before the activation step.

The present invention also relates to a method for producing an activated carbon fiber formed body of the present invention, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body; and activating the polyphenylene ether fiber formed body.

The method for producing an activated carbon fiber formed body of the present invention preferably further comprises the step of carbonizing the polyphenylene ether fiber formed body before the activation step.

The present invention also relates to a method for producing an activated carbon fiber formed body of the present invention, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

infusibilizing the polyphenylene ether fiber formed body to produce an infusibilized polyphenylene ether fiber formed body; and activating the infusibilized polyphenylene ether fiber formed body.

The method for producing an activated carbon fiber formed body of the present invention preferably further comprises the step of carbonizing the infusibilized polyphenylene ether fiber formed body before the activation step.

The present invention also relates to a method for producing an activated carbon fiber formed body of the present invention, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

flameproofing the polyphenylene ether fiber formed body to produce a flameproofed polyphenylene ether fiber formed body; and activating the flameproofed polyphenylene ether fiber formed body.

The present invention also relates to a method for producing an activated carbon fiber formed body of the present invention, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

infusibilizing the polyphenylene ether fiber formed body to produce an infusibilized polyphenylene ether fiber formed body;

flameproofing the infusibilized polyphenylene ether fiber formed body to produce a flameproofed polyphenylene ether fiber formed body; and activating the flameproofed polyphenylene ether fiber formed body.

The method for producing an activated carbon fiber formed body of the present invention preferably further comprises the step of carbonizing the flameproofed polyphenylene ether fiber formed body before the activation step.

The present invention also relates to an organic solvent adsorption/desorption device that cleans a gas to be treated by adsorbing and removing an organic solvent from the gas to be treated containing the organic solvent, and desorbs the adsorbed organic solvent, the device comprising:

an adsorption tank filled with an adsorbent that adsorbs the organic solvent by bringing the gas to be treated into contact with the adsorbent, and desorbs the adsorbed organic solvent by bringing water vapor or a heating gas into contact with the adsorbent, wherein the adsorbent contains the activated carbon fiber formed body of the present invention.

The present invention also relates to an organic solvent recovery system comprising:

the organic solvent adsorption/desorption device of the present invention; and an organic solvent recovery device that condenses a desorption gas discharged from the organic solvent adsorption/desorption device to recover an organic solvent.

The present invention also relates to a method for adsorbing/desorbing an organic solvent, the method cleaning a gas to be treated by adsorbing and removing the organic solvent from the gas to be treated containing the organic solvent, and desorbing the adsorbed organic solvent, the method comprising the steps of:

adsorbing the organic solvent by bringing the gas to be treated into contact with an adsorbent; and desorbing the adsorbed organic solvent by bringing water vapor or a heating gas into contact with the adsorbent, wherein the adsorbent contains the activated carbon fiber formed body of the present invention.

The present invention also relates to a method for recovering an organic solvent, the method cleaning a gas to be treated by adsorbing and removing the organic solvent from the gas to be treated containing the organic solvent, desorbing the adsorbed organic solvent, and recovering the organic solvent by condensing a desorbed gas to be discharged, the method comprising the steps of:

adsorbing the organic solvent by bringing the gas to be treated into contact with an adsorbent; and desorbing the adsorbed organic solvent by bringing water vapor or a heating gas into contact with the adsorbent, wherein the adsorbent contains the activated carbon fiber formed body of the present invention.

Effect of the Invention

The activated carbon fiber of the present invention is obtained by activating a polyphenylene ether fiber or the like containing a polyphenylene ether component having a rearrangement structure, and is excellent in mechanical strength and processability even when the diameter of the activated carbon fiber is increased. The activated carbon fiber of the present invention has an advantage that no harmful gas is generated even when a decomposition gas generated during carbonization or activation is burned. The activated carbon fiber of the present invention advantageously makes it unnecessary to use harmful substances such as aldehydes that adversely affect the human body and the environment in the production thereof. The activated carbon fiber of the present invention has excellent adsorption performance and physical properties in place of the phenolic activated carbon fiber.

MODE FOR CARRYING OUT THE INVENTION

A polyphenylene ether fiber used in the present invention contains a polyphenylene ether component which has a rearrangement structure connected by a bond at an ortho-position in a repeating unit continuously bonded at a para-position. Here, the "rearrangement structure connected by a bond at an ortho-position" is a structure in which a connected side chain bonded at an ortho-position is formed in a part of a repeating unit continuously bonded at a para-position of a main chain. The side chain may be formed of a repeating unit continuously bonded at a para-position, or may have a moiety partially bonded at an ortho-position therein.

The repeating unit continuously bonded at a para-position is preferably a repeating unit represented by the following general formula (1):

[Formula 3]

(1)

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent. The rearrangement structure preferably has a rearrangement structure represented by the following general formula (2):

[Formula 4]

(2)

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3\prime}$ represents a divalent group in which one hydrogen atom is removed from $R^3$. In the general formula (2), "~" indicates that a structure after "~" is not particularly limited. The "~" moiety may be formed of a phenylene ether unit continuously bonded at a para-position, or may have a moiety partially bonded at an ortho-position therein.

The rearrangement reaction is, for example, a reaction represented by the following formula:

[Formula 5]

and is also referred to as methylene bridge rearrangement.

Generally, a polyphenylene ether is infusibilized (subjected to an infusibilization treatment) under a high-temperature air atmosphere, and then carbonized (subjected to a carbonization treatment) under a high-temperature inert gas atmosphere to obtain a carbonaceous material. In the case of using a material obtained by previously modifying a polyphenylene ether to be thermosetting or a material obtained by previously blending a polyphenylene ether with a component having a crosslinking group, it is not necessary to infusibilize the polyphenylene ether. The present inventors have found that a porous material having excellent adsorption performance can be obtained by activating a polyphenylene ether, an infusibilized polyphenylene ether obtained by infusibilizing a polyphenylene ether, a flameproofed polyphenylene ether obtained by flameproofing the polyphenylene ether or the infusibilized polyphenylene ether, or a carbonaceous material obtained by carbonizing any of the polyphenylene ethers. When a conventional laminated body in which polyphenylene ether fibers are laminated, and a polyphenylene ether fiber formed body formed into a nonwoven fabric or the like are subjected to one or more treatments selected from the group consisting of infusibilization, flameproofing, carbonization, and activation, there is a problem that the fibers are significantly fused to each other or the fibers are significantly thermally shrunk. The significant fusion between the fibers and the significant heat shrinkage of the fibers cause insufficient mechanical strength, flexibility, and dimensional stability required for activated carbon fibers. In the present invention, the polyphenylene ether fiber containing the polyphenylene ether component having a rearrangement structure is used, and therefore the fusion between the fibers and the thermal shrinkage of the fibers when the treatment is performed are suppressed, whereby the mechanical strength, flexibility, and dimensional stability of the activated carbon fiber are significantly improved. In the present invention, the weight yield after activation was significantly improved. Hereinafter, each component of the present invention will be described.

Polyphenylene Ether Component

The polyphenylene ether component used in the present invention contains polyphenylene ether having a rearrangement structure connected by a bond at an ortho-position in a repeating unit continuously bonded at a para-position.

The repeating unit continuously bonded at a para-position is preferably a repeating unit represented by the general formula (1), and the rearrangement structure preferably has a rearrangement structure represented by the general formula (2).

Examples of $R^1$ and $R^2$ in the general formulae (1) and (2) include a hydrogen atom, alykl groups having 1 to 10 carbon atoms such as a methyl group, an ethyl group, a propyl group, an isopropyl group, an n-butyl group, an isobutyl group, a t-butyl group, a pentyl group, a cyclopentyl group, a hexyl group, a cyclohexyl group, an octyl group, and a decyl group, aryl groups having 6 to 10 carbon atoms such as a phenyl group, a 4-methylphenyl group, a 1-naphthyl group, and a 2-naphthyl group, and aralkyl groups having 7 to 10 carbon atoms such as a benzyl group, a 2-phenylethyl group, and a 1-phenylethyl group.

When the hydrocarbon group has a substituent, examples of the substituent include halogen atoms such as a fluorine atom, and alkoxy groups such as a methoxy group. Specific examples of the hydrocarbon group having a substituent include a trifluoromethyl group.

Among them, $R^1$ and $R^2$ are preferably a hydrogen atom or a methyl group, and more preferably a hydrogen atom.

Examples of $R^3$ in the general formulae (1) and (2) include alkyl groups having 1 to 10 carbon atoms such as a methyl group, an ethyl group, a propyl group, an isopropyl group, an n-butyl group, an isobutyl group, a t-butyl group, a pentyl group, a cyclopentyl group, a hexyl group, a cyclohexyl group, an octyl group, and a decyl group, aryl groups having 6 to 10 carbon atoms such as a phenyl group, a 4-methylphenyl group, a 1-naphthyl group, and a 2-naphthyl group, and aralykl groups having 7 to 10 carbon atoms such as a benzyl group, a 2-phenylethyl group, and a 1-phenylethyl group.

When the hydrocarbon group has a substituent, examples of the substituent include halogen atoms such as a fluorine atom, and alkoxy groups such as a methoxy group. Specific examples of the hydrocarbon group having a substituent include a trifluoromethyl group.

Among them, $R^3$ is preferably a methyl group.

$R^{3'}$ represents a divalent group in which one hydrogen atom is removed from $R^3$, and is preferably a methylene group.

Specific examples of the repeating unit of the general formula (1) include repeating units derived from 2,6-dimethyl-1,4-phenylene ether, 2,6-diethyl-1,4-phenylene ether, 2-methyl-6-ethyl-1,4-phenylene ether, and 2,6-dipropyl-1,4-phenylene ether. Among them, a repeating unit derived from 2,6-dimethyl-1,4-phenylene ether is preferable.

The polyphenylene ether component having a rearrangement structure preferably has the rearrangement structure represented by the general formula (2) in a homopolymer having a repeating unit of the general formula (1) or a copolymer containing two or more different repeating units of the general formula (1).

The polyphenylene ether component having a rearrangement structure may contain a repeating unit other than the repeating unit of the general formula (1) as long as the effects of the present invention are not impaired. In this case, the polyphenylene ether component may have the rearrangement structure represented by the general formula (2) in a copolymer containing a repeating unit of the general formula (1) and a repeating unit other than the repeating unit of the general formula (1). The content of such a repeating unit other than the repeating unit of the general formula (1) is not particularly limited as long as the effects of the present invention are not impaired, but for example, the content of the repeating unit is preferably about 5 mol% or less in the copolymer, and it is more preferable that the repeating unit be not contained.

The molecular weight of the polyphenylene ether component having a rearrangement structure is not particularly limited, but the weight average molecular weight (Mw) is preferably 40,000 to 100,000, and more preferably 50,000 to 80,000. The number average molecular weight (Mn) of the polyphenylene ether is preferably 7,000 to 30,000, and more preferably 8,000 to 20,000. The molecular weight dispersion (Mw/Mn) of the polyphenylene ether is preferably 3.5 to 8.0, and more preferably 4.0 to 6.0. The weight average molecular weight and the number average molecular weight can be measured using, for example, HLC-8320GPC manufactured by Tosoh Corporation. As a column, two TSKgel SuperHM-H columns and one TSKgel SuperH 2000 column are connected in series and used. Chloroform can be used as a mobile phase, and it is preferable that a flow rate is 0.6 ml/min, and the temperature of a column oven is 40° C. The weight average molecular weight and the number average molecular weight are preferably measured after a chloroform solution containing the polyphenylene ether component as a concentration of 1 g/L is prepared and then allowed to stand for 1 hour. The weight average molecular weight and the number average molecular weight can be calculated by preparing a calibration curve using standard polystyrene. The UV wavelength of a detector can be evaluated as 283 nm in the case of an object to be evaluated, and 254 nm in the case of the standard polystyrene.

The amount of rearrangement in the polyphenylene ether component having a rearrangement structure is preferably 0.01 mol% or more, more preferably 0.05 mol% or more, still more preferably 0.1 mol% or more, and particularly preferably 0.15 mol% or more, with respect to all polyphenylene ether structural units in the polyphenylene ether component. Furthermore, in order to obtain a small fineness fiber having a single filament fineness of 15 dtex or less, the amount of rearrangement is preferably 2 mol% or more. The upper limit value of the amount of rearrangement is not particularly limited, but is preferably 20 mol% or less, more preferably 18 mol% or less, still more preferably 5 mol% or less, and still more preferably 4 mol% or less. When the amount of rearrangement in the polyphenylene ether component having a rearrangement structure is within the above range, the fusion between the polyphenylene ether fibers and the thermal shrinkage of the fibers when the fibers are subjected to one or more treatments selected from the group consisting of infusibilization, flameproofing, carbonization, and activation are suppressed, and therefore the mechanical strength, flexibility, and dimensional stability of each of the activated carbon fiber and the activated carbon fiber formed body tend to be improved. Since the amount of tar generated during carbonization and/or activation under a high-temperature inert gas atmosphere is reduced, the weight yield after carbonization and/or activation tends to be improved.

The rearrangement structure preferably exhibits a peak in a range of 3.8 to 4.0 ppm and a peak in a range of 6.8 to 7.0 ppm in nuclear magnetic resonance spectrum ($^1$H-NMR) measurement. Usually, the polyphenylene ether exhibits a peak at around 6.4 to 6.6 ppm, which is a peak derived from hydrogen atoms at the 3 and 5 positions of a benzene ring in the main chain of the polyphenylene ether. The polyphenylene ether component having a rearrangement structure exhibits a peak in a range of 3.8 to 4.0 ppm and a peak in a range of 6.8 to 7.0 ppm in addition to the peak at around 6.4 to 6.6 ppm. The chemical shift of 3.8 to 4.0 ppm is derived from a proton of a divalent group represented by $R^{3'}$ (for example, a methylene group or the like) in the rearrangement structure. The chemical shift of 6.8 to 7.0 ppm is derived from protons of $R^1$ and $R^2$ groups at the 3 and 5 positions of the polyphenylene ether in the rearrangement structure (for example, hydrogen atoms at the 3-position and 5-position of a benzene ring bonded at an ortho-position via a methylene group).

The polyphenylene ether fiber used in the present invention may contain polyphenylene ether having no rearrangement structure. Examples of the polyphenylene ether having no rearrangement structure include a homopolymer having a repeating unit of the general formula (1), a copolymer containing two or more different repeating units of the general formula (1), and a copolymer containing a repeating unit of the general formula (1) and a repeating unit other than the repeating unit of the general formula (1). Examples of the content of the repeating unit other than the repeating unit of the general formula (1) in the copolymer include those described above.

The polyphenylene ether fiber used in the present invention may contain low molecular weight polyphenylene ether. Examples of the molecular weight of the low molecular weight polyphenylene ether include a weight average molecular weight of about 2,000 to 8,000.

The content of the polyphenylene ether component having the rearrangement structure is preferably 95% by mass or more, more preferably 98% by mass or more, and still more preferably substantially composed only of the polyphenylene ether component having the rearrangement structure (100% by mass), in the polyphenylene ether fiber. When the content of the polyphenylene ether component having a rearrangement structure in the polyphenylene ether fiber is within the above-mentioned range, not only the mechanical strength of each of the activated carbon fiber obtained by activating the polyphenylene ether fiber or the like and the activated carbon fiber formed body is excellent, but also flexibility and dimensional stability thereof are excellent, which is preferable. Since the amount of tar generated during carbonization and/or activation under a high-temperature inert gas atmosphere is reduced, the weight yield after carbonization and/or activation tends to be improved, which is preferable.

Component Other Than Polyphenylene Ether Component

The polyphenylene ether fiber used in the present invention may contain a resin component other than the polyphenylene ether component. Examples of the resin component other than the polyphenylene ether component include polystyrene, polyethylene, polypropylene, polyamides such as polyamide 4, polyamide 6, polyamide 10, polyamide 11, polyamide 66, polyamide 6T, and polyamide 6T/11, polyesters such as polyethylene terephthalate and polybutylene terephthalate, and polycarbonate. However, the content of the resin component is preferably 5% by mass or less, and more preferably 2% by mass or less. It is still more preferable that the resin component is not contained (0% by mass).

Additives such as a lubricant, a plasticizer, an antioxidant, an ultraviolet absorber, a texturing agent, and an antistatic agent can also be added to the polyphenylene ether fiber used in the present invention as long as the effects of the present invention are not impaired.

Polyphenylene Ether Fiber

The polyphenylene ether fiber used in the present invention contains the polyphenylene ether component having the rearrangement structure, and the method for producing the polyphenylene ether fiber is not particularly limited. However, for example, the polyphenylene ether fiber can also be produced by a method for producing a polyphenylene ether fiber as described later.

The glass transition temperature of the polyphenylene ether fiber is not particularly limited, but is preferably 190° C. or higher and 210° C. or lower, more preferably 190° C. or higher and 209° C. or lower, and still more preferably 200° C. or higher and 208° C. or lower. When the glass transition temperature is within the above rage, it is possible to suppress the fusion between the polyphenylene ether fibers when the fibers are subjected to one or more treatments selected from the group consisting of infusibilization, flameproofing, carbonization, and activation, and it is possible to achieve both the flexibility and dimensional stability of each of the activated carbon fiber obtained by activating the polyphenylene ether fiber and the like and the activated carbon fiber formed body in a well-balanced manner, which is preferable.

The amount of radicals in the polyphenylene ether fiber is preferably 50 g$^{-1}$ or more, more preferably 70 g$^{-1}$ or more, and still more preferably 90 g$^{-1}$ or more. When the amount of radicals is in the above range, it is possible to further suppress the fusion between the polyphenylene ether fibers when the fibers are subjected to one or more treatments selected from the group consisting of infusibilization, flameproofing, carbonization, and activation, and the flexibility and dimensional stability of each of the activated carbon fiber obtained by activating the polyphenylene ether fiber and the like and the activated carbon fiber formed body tend to be improved, which is preferable. Furthermore, since the amount of tar generated during carbonization and/or activation is further reduced, the weight yield after carbonization and/or activation tends to be improved, which is preferable. The upper limit of the amount of radicals in the polyphenylene ether fiber is not particularly limited, but is preferably 6000 g$^{-1}$ or less, more preferably 5500 g$^{-1}$ or less, and still more preferably 5000 g$^{-1}$ or less, from the viewpoint of the mechanical strength of each of the activated carbon fiber obtained by activating the polyphenylene ether fiber or the like and the activated carbon fiber formed body.

Polyphenylene Ether Fiber Formed Body

The polyphenylene ether fiber formed body used in the present invention contains the polyphenylene ether fiber, and examples of the form thereof include paper, a woven fabric, a knitted fabric, and a nonwoven fabric. Among them, a nonwoven fabric is preferable because of high versatility, and a short fiber nonwoven fabric or a long fiber nonwoven fabric is more preferable. A method for producing a polyphenylene ether fiber formed body is not particularly limited, but for example, the polyphenylene ether fiber formed body can be produced by a method for producing a polyphenylene ether fiber formed body as described later.

Activated Carbon Fiber

The activated carbon fiber of the present invention is obtained by activating (activation treatment) the polyphenylene ether fiber, an infusibilized polyphenylene ether fiber obtained by infusibilizing the polyphenylene ether fiber, a flameproofed polyphenylene ether fiber obtained by flameproofing the polyphenylene ether fiber or the infusibilized polyphenylene ether fiber, or a carbon fiber obtained by carbonizing any of the polyphenylene ether fibers, and a method for producing the activated carbon fiber is not particularly limited, but can be produced, for example, by a method for producing an activated carbon fiber as described later.

The activated carbon fiber of the present invention is preferably obtained by infusibilizing the polyphenylene ether fiber and then activating the infusibilized polyphenylene ether fiber. Alternatively, the infusibilized polyphenylene ether fiber may be carbonized, and then activated. The carbonization and the activation may be simultaneously performed. By infusibilizing the polyphenylene ether fibers, the fusion between the fibers during carbonization and/or activation can be further suppressed, which is preferable. The activated carbon fiber and the activated carbon fiber formed body obtained by activation tend to be improved in mechanical strength, flexibility, and dimensional stability, which is preferable. Furthermore, since the amount of tar generated during carbonization and/or activation is further reduced, the weight yield after carbonization and/or activation tends to be improved, which is preferable.

The fiber diameter of the activated carbon fiber of the present invention is preferably 10 μm or more and 100 μm or less, more preferably 12 μm or more and 90 μm or less, still more preferably 15 μm or more and 80 μm or less. When the fiber diameter is less than 10 μm, for example, a pressure loss tends to increase when the fiber is used as a filter, and when the fiber diameter is more than 100 μm, sufficient adsorption performance as the filter cannot be obtained, and flexibility as the fiber tends to be impaired.

The BET specific surface area of the activated carbon fiber of the present invention is preferably 500 $m^2/g$ or more and 2500 $m^2/g$ or less, more preferably 650 $m^2/g$ or more and 2400 $m^2/g$ or less, still more preferably 800 $m^2/g$ or more and 2300 $m^2/g$ or less. When the BET specific surface area is within the above range, even a small amount of activated carbon fiber can exhibit sufficient adsorption performance. Meanwhile, when the BET specific surface area is more than 2500 $m^2/g$, the mechanical strength of the activated carbon fiber tends to decrease.

Activated Carbon Fiber Formed Body

The activated carbon fiber formed body of the present invention contains the activated carbon fiber. Examples of the activated carbon fiber formed body include activated carbon fiber paper, an activated carbon fiber woven fabric, an activated carbon fiber knitted fabric, and an activated carbon fiber nonwoven fabric. Among them, an activated carbon fiber nonwoven fabric is preferable because of high versatility. The activated carbon fiber nonwoven fabric is, for example, wound around a cylinder to be processed into a cylindrical activated carbon fiber nonwoven fabric element, which is used as an adsorbent of an organic solvent adsorption/desorption device and an adsorbent of an organic solvent recovery system using the organic solvent adsorption/desorption device.

The basis weight of the activated carbon fiber formed body is not particularly limited, and can be appropriately determined depending on its application, but is preferably 10 $g/m^2$ or more, more preferably 30 $g/m^2$ or more, and still more preferably 100 $g/m^2$ or more, and preferably 800 $g/m^2$ or less, more preferably 600 $g/m^2$ or less, and still more preferably 400 $g/m^2$ or less from the viewpoints of processability, and the adsorption properties and physical properties of an activated carbon fiber to be manufactured.

The thickness of the activated carbon fiber formed body (for example, a nonwoven fabric or the like) is not particularly limited, and can be appropriately determined depending on its application, but is preferably 0.1 mm or more and 12.0 mm or less, and more preferably 0.2 mm or more and 6.0 mm or less from the viewpoints of processability, and the adsorption properties and physical properties.

The tensile strength of the activated carbon fiber nonwoven fabric is preferably 4 $N/cm^2$ or more, more preferably 4.5 $N/cm^2$ or more, and still more preferably 5 $N/cm^2$ or more. When the tensile strength is 4 $N/cm^2$ or more, the activated carbon fiber nonwoven fabric is less likely to be damaged even if the tension when the activated carbon fiber nonwoven fabric is strongly wound around a cylinder is increased, and therefore an element having a high bulk density and excellent shape stability can be obtained. The upper limit of the tensile strength is not particularly limited, but when the fiber diameter is 10 μm or more, it is difficult to achieve tensile strength exceeding 20 $N/cm^2$.

The activated carbon fiber nonwoven fabric is preferably a short fiber nonwoven fabric. Since the short fiber nonwoven fabric is blended with, for example, other fibers can be easily produced, the activated carbon fiber nonwoven fabric can be applied to a wide range of fields as a functional material.

The activated carbon fiber nonwoven fabric is preferably a long fiber nonwoven fabric. The long fiber nonwoven fabric tends to be able to reduce the number of production processes, and makes it also possible to easily provide an increase in the diameter, which is difficult to process in the short fiber nonwoven fabric.

Method for Producing Polyphenylene Ether Fiber

A method for producing a polyphenylene ether fiber used in the present invention includes, for example, the step of causing an extruder including a cylinder and a screw to melt extrude polyphenylene ether as a raw material.

Examples of the polyphenylene ether as the raw material include a homopolymer having a repeating unit of the general formula (1), a copolymer containing two or more different repeating units of the general formula (1), and a copolymer having a repeating unit of the general formula (1) and a repeating unit other than the repeating unit of the general formula (1). Examples of the content of the repeating unit other than the repeating unit of the general formula (1) in the copolymer include those described above. Among them, a homopolymer having a repeating unit of the general formula (1) is preferable.

Specific examples of the homopolymer having a repeating unit of the general formula (1) include poly(2,6-dimethyl-1,4-phenylene ether), poly(2,6-diethyl-1,4-phenylene ether), poly(2-methyl-6-ethyl-1,4-phenylene ether), and poly(2,6-dipropyl-1,4-phenylene ether), and among them, poly(2,6-dimethyl-1,4-phenylene ether) is preferred.

As poly(2,6-dimethyl-1,4-phenylene ether), commercially available products can also be suitably used, and specific examples thereof include PPO 640, PPO 646, and PPOSA 120 manufactured by SABIC Innovative Plastics, and XYRON S201A and XYRON S202A manufactured by Asahi Kasei Chemicals Corporation.

The glass transition temperature of the polyphenylene ether as the raw material is preferably 170° C. or higher, more preferably 200° C. or higher, and still more preferably 210° C. or higher. The upper limit value of the glass transition temperature is not particularly limited, but is preferably 230° C. or lower. When the glass transition temperature of the polyphenylene ether as the raw material is within the above range, it is possible to suppress the fusion between the polyphenylene ether fibers when the fibers are subjected to one or more treatments selected from the group consisting of infusibilization, flameproofing, carbonization, and activation, and it is possible to achieve both the flexibility and dimensional stability of each of the activated carbon fiber obtained by activating the polyphenylene ether fiber and the like and the activated carbon fiber formed body in a well-balanced manner, which is preferable.

The raw material used in the present invention may contain two or more polyphenylene ethers having different glass transition temperatures. Specifically, the raw material may contain polyphenylene ether having a glass transition temperature of less than 170° C. in addition to the polyphenylene ether having a glass transition temperature of 170° C. or higher. The polyphenylene ether having a glass transition temperature of lower than 170° C. is added, whereby the melt viscosity of the raw material is decreased to improve the fluidity of the raw material, but the amount of rearrangement in the polyphenylene ether tends to be decreased.

The content of the polyphenylene ether having a glass transition temperature of 170° C. or higher in the polyphenylene ether as the raw material is preferably 80% by mass or more, more preferably 90% by mass or more, and still more preferably 95% by mass or more. The raw material is particularly preferably composed only of the polyphenylene ether having a glass transition temperature of 170° C. or higher. The upper limit value of the content of the polyphenylene ether having a glass transition temperature of 170° C. or higher is not particularly limited, but is preferably 100% by mass or less. In the present invention, when the polyphenylene ether having a high glass transition temperature (that is, a high molecular weight) is contained in the above range, the activated carbon fiber obtained by activating the polyphenylene ether fiber or the like and the activated carbon fiber formed body are preferable because not only the mechanical strength of each of the activated carbon fiber and the activated carbon fiber formed body is excellent, but also the flexibility and dimensional stability thereof are excellent, which is preferable. Since the amount of tar generated during carbonization and/or activation is reduced, the weight yield after carbonization and/or activation tends to be improved, which is preferable.

In addition to the polyphenylene ether as the raw material, a resin component other than the polyphenylene ether component, and an additive can be contained. The resin component other than the polyphenylene ether component and the additive are as described above. The content of the resin component other than the polyphenylene ether component in the raw material is preferably 5% by mass or less, and more preferably 2% by mass or less. It is still more preferable that the resin component not be contained (0% by mass).

As the extruder including the cylinder and the screw, a single screw extruder or a twin screw extruder which can be usually used in the present field can be used. In the present invention, it is preferable to use a twin screw extruder. The extruder is not limited thereto, and any extruder may be used as long as the extruder can achieve the purpose of effectively subjecting a polymer to shear.

The peripheral speed of the screw is required to provide the rearrangement reaction of the polyphenylene ether as the raw material, and is 3.6 m/min or more, preferably 3.7 m/min or more, and more preferably 3.8 m/min or more. The upper limit value of the peripheral speed of the screw is not particularly limited, but is preferably 94.2 m/min or less. In the present invention, the rotation speed of the screw is increased to set the peripheral speed of the screw to 3.6 m/min or more, whereby a high shear force can be applied to the raw material polyphenylene ether in the cylinder, and as a result, the molecular chain of the polyphenylene ether can be cleaved to form polyphenylene ether having a rearrangement structure.

The shape of the screw is not particularly limited as long as a shearing force can be applied to such an extent that the rearrangement reaction of the polyphenylene ether as the raw material is provided.

Figure 1:
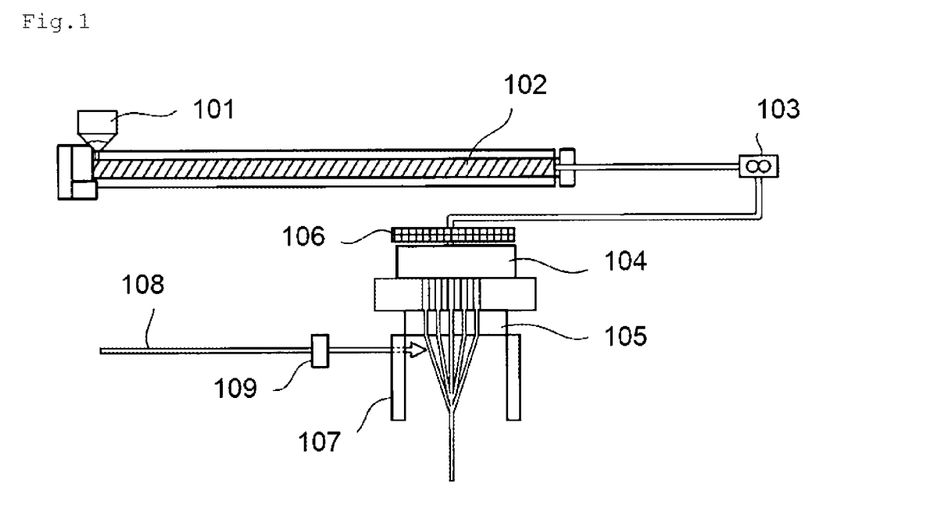
FIG. 1 is a cross-sectional view schematically showing one embodiment of a method for producing a polyphenylene ether fiber used in the present invention.

An example of a case of producing a polyphenylene ether melt-spun fiber will be described with reference to FIG. 1. polyphenylene ether as a raw material is charged into an extruder 102 including a cylinder and a screw from a hopper 101 in FIG. 1. The discharge speed of the molten polyphenylene ether is measured by a gear pump 103. The molten polyphenylene ether passes through a filter material 104 composed of fine sands and the like, and is discharged from a spinning nozzle 105, whereby a melt-spun fiber can be obtained. A filter 106 composed of a metal nonwoven fabric or the like is preferably set on the filter material 104. The filter 106 is set, whereby foreign substances can be removed in advance, and the clogging and the like of the filter material 104 can be prevented, which is preferable. A heat-retaining space 107 is provided immediately below the spinning nozzle 105, and introduction 108 of an inert gas such as nitrogen into the region is performed to allow spinning. A heated inert gas can also be introduced by a heating torch 109.

Method for Producing Polyphenylene Ether Fiber Formed Body

A method for producing a polyphenylene ether fiber formed body used in the present invention is not particularly limited, and methods commonly used in the art can be appropriately adopted. Examples of a method for producing a nonwoven fabric which is a preferred example of the formed body of the present invention include a spunbond method, a meltblow method, a spunlace method, a needle punch method, a thermal bond method, and a chemical bond method. Among them, a needle punch method, which is a method for producing a short fiber nonwoven fabric, and a spunbond method, which is a method for producing a long fiber nonwoven fabric, are preferable.

Infusibilized Polyphenylene Ether Fiber or Method For Producing Infusibilized Polyphenylene Ether Fiber Formed Body An infusibilized polyphenylene ether fiber or an infusibilized polyphenylene ether formed body used in the present invention can be manufactured by subjecting the polyphenylene ether fiber or the polyphenylene ether formed body to a heat treatment at 120 to 230° C. for 0.1 to 100 hours in air for infusibilizing (infusibilization treatment). Here, "in air" refers to an environment which is not particularly adjusted. A treatment temperature is preferably 140 to 220° C., and more preferably 150 to 210° C. A treatment time is preferably 0.1 to 100 hours, more preferably 0.5 to 80 hours, and still more preferably 1 to 50 hours. By setting the infusibilization temperature and the infusibilization treatment time within the above ranges, it is possible to further suppress the fusion between the fibers during carbonization and/or activation, which is preferable. The activated carbon fiber and the activated carbon fiber formed body obtained by activation can have mechanical strength, flexibility, and dimensional stability in a well-balanced manner, which is preferable. Furthermore, since the amount of tar generated during carbonization and/or activation is further reduced, the weight yield after carbonization and/or activation tends to be improved, which is preferable.

Method For Producing Flameproofed Polyphenylene Ether Fiber or Flameproofed Polyphenylene Ether Fiber Formed Body The flameproofed polyphenylene ether fiber or the flameproofed polyphenylene ether fiber formed body used in the present invention can be produced by subjecting the infusibilized polyphenylene ether fiber or the infusibilized polyphenylene ether fiber formed body to a heat treatment at 230 to 400° C. for 0.01 to 10 hours in air to achieve flameproofing (flameproofing treatment). The flameproofed polyphenylene ether fiber or the flameproofed polyphenylene ether fiber formed body used in the present invention may be produced by heating the polyphenylene ether fiber or the polyphenylene ether fiber formed body to 120 to 230° C. at a temperature rise rate of 0.05 to 10° C./min in air, and then subjecting the polyphenylene ether fiber or the polyphenylene ether fiber formed body to a heat treatment at 230 to 400° C. for 0.01 to 10 hours to achieve flameproofing (flameproofing treatment). "In air" refers to an environment which is not particularly adjusted. A treatment temperature is preferably 240 to 380° C., and more preferably 250 to 360° C. A treatment time is preferably 0.03 to 4 hours, and more preferably 0.05 to 3 hours. By setting the flameproofing treatment temperature and the flameproofing treatment time within the above ranges, it is possible to further suppress the fusion between the fibers during carbonization and/or activation, which is preferable. The activated carbon fiber and the activated carbon fiber formed body obtained by activation can have mechanical strength, flexibility, and dimensional stability in a well-balanced manner, which is preferable. Furthermore, since the amount of tar generated during carbonization and/or activation is further reduced, the weight yield after carbonization and/or activation tends to be improved, which is preferable.

Method For Producing Activated Carbon Fiber or Activated Carbon Fiber Formed Body The activated carbon fiber of the present invention can be produced by activating (activation treatment) the polyphenylene ether fiber, the infusibilized polyphenylene ether fiber, the flameproofed polyphenylene ether fiber, or a carbon fiber obtained by carbonizing (carbonization treatment) any of the polyphenylene ether fibers. The activated carbon fiber formed body of the present invention can be produced by activating the polyphenylene ether fiber formed body, the infusibilized polyphenylene ether fiber formed body, the flameproofed polyphenylene ether fiber formed body, or a carbon fiber formed body obtained by carbonizing any of the polyphenylene ether fiber formed bodies. The activated carbon fiber formed body of the present invention may be produced by activating the polyphenylene ether fiber, the infusibilized polyphenylene ether fiber, the flameproofed polyphenylene ether fiber, or a carbon fiber obtained by carbonizing any of the polyphenylene ether fibers, and processing and forming the obtained activated carbon fiber.

The carbonization (carbonization treatment) can be performed by known methods, and specifically, is performed by heating in the presence of an inert gas. Examples of the inert gas include nitrogen and argon. A heating temperature is commonly 300 to 2500° C., and preferably 500 to 1500° C. A heating time is commonly 0.1 to 10 hours, and preferably 0.5 to 5 hours.

The activation (activation treatment) can be performed by known methods. Specific examples thereof include a gas activation method and a chemical activation method, and a gas activation method is preferable from the viewpoint of improving fiber strength and purity.

In the gas activation method, an activation gas is brought into contact with the the polyphenylene ether fiber, the infusibilized polyphenylene ether fiber, the flameproof polyphenylene ether fiber, the carbon fiber, the polyphenylene ether fiber formed body, the infusibilized polyphenylene ether fiber formed body, the flameproof polyphenylene ether fiber formed body, or the carbon fiber formed body to activate the fibers and the formed bodies. Examples if the activation gas include water vapor, air, carbon monoxide, carbon dioxide, hydrogen chloride, oxygen, and a mixed gas thereof. A temperature at the time of gas activation is usually 600 to 1200° C., and preferably 800 to 1000° C. A time for gas activation is usually 0.2 to 10 hours, and preferably 0.5 to 3 hours.

In the chemical activation method, alkali metal hydroxides such as sodium hydroxide and potassium hydroxide; alkaline earth metal hydroxides such as calcium hydroxide; inorganic acids such as boric acid, phosphoric acid, sulfuric acid, and hydrochloric acid; and inorganic salts such as zinc chloride are brought into contact with the polyphenylene ether fiber, the infusibilized polyphenylene ether fiber, the flameproof polyphenylene ether fiber, the carbon fiber, the polyphenylene ether fiber formed body, the infusibilized polyphenylene ether fiber formed body, the flameproof polyphenylene ether fiber formed body, or the carbon fiber formed body to activate the fibers and the formed bodies. A temperature at the time of chemical activation is usually 400 to 1000° C., and preferably 500 to 800° C. A time for chemical activation is usually 0.2 to 5 hours, and preferably 0.5 to 5 hours.

The maximum value of the width shrinkage ratio of the activated carbon fiber when subjected to the activation treatment is preferably 50% or less, more preferably 40% or less, and still more preferably 35% or less, from the viewpoint of processability, and flexibility and shape stability of the activated carbon fiber. The minimum value of the width shrinkage ratio is commonly 1% or more, more preferably 5% or more, and still more preferably 10% or more.

The minimum value of the weight yield of the activated carbon fiber when subjected to the activation treatment is preferably 15% by weight or more, more preferably 20% by weight or more, and still more preferably 30% by weight or more, from the viewpoint of production cost and an environmental load due to the exhaust of a decomposition gas. The maximum value of the weight yield is commonly 80% by weight or less, more preferably 70% by weight or less, and still more preferably 60% by weight or less.

In the present invention, the carbonization (carbonization treatment) and the activation (activation treatment) may be simultaneously performed.

The activated carbon fiber and the activated carbon fiber formed body of the present invention are suitably used for, for example, recovering an organic solvent such as dichloromethane; removing a chlorine compound such as trihalomethane; removing harmful gases such as malodorous gases, NOx, and SOx; and removing heavy metals such as lead, arsenic, and manganese.

Figure 2:
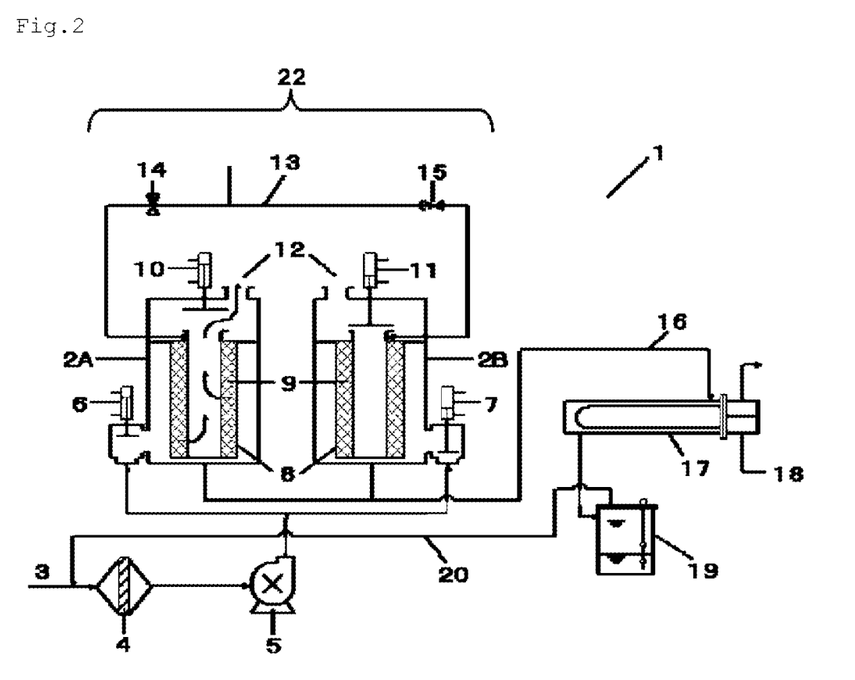
FIG. 2 is a flowchart showing an embodiment of an organic solvent recovery system of the present invention.

Organic Solvent Adsorption/Desorption Device, Organic Solvent Recovery System, Method For Adsorbing/Desorbing Organic Solvent, and Method For Recovering Organic Solvent An embodiment of an organic solvent recovery system of the present invention will be described with reference to FIG. 2. An organic solvent recovery system 1 includes an organic solvent adsorption/desorption device 22 including adsorption tanks 2A and 2B. Inside the adsorption tanks 2A and 2B, an activated carbon fiber nonwoven fabric element 8 having a hollow cylindrical structure in which an activated carbon fiber nonwoven fabric 9 (adsorbent) is wound in layers around a cylindrical cage type winding core is detachably provided. The outer peripheral surface of the activated carbon fiber nonwoven fabric element 8 is fixed with a wire mesh. Although the organic solvent recovery system 1 including two adsorption tanks is illustrated in FIG. 2, one adsorption tank may be provided, or three or more adsorption tanks may be provided. The bottom of the activated carbon fiber nonwoven fabric element 8 is closed.

A case where the adsorption tank 2A in FIG. 2 is performing the adsorption treatment and the adsorption tank 2B is performing the desorption treatment will be described. First, an adsorption step will be described. A solvent mixed gas (gas to be treated) 3 containing an organic solvent passes through a prefilter 4, and is sent to an adsorption tank 2A via a lower damper 6 by a blower 5, where the organic solvent in the gas to be treated is adsorbed by the activated carbon fiber nonwoven fabric 9 of the activated carbon fiber nonwoven fabric element 8, and is discharged as clean air from an exhaust port 12 of the adsorption tank 2A to the outside of the system via an upper damper 10. At this time, an automatic valve 14 of a water vapor supply line 13 is in a closed state.

Next, a desorption step will be described. Water vapor supplied from the water vapor supply line 13 is supplied to the adsorption tank 2B via an automatic valve 15, and desorbs and regenerates the organic solvent in the gas to be treated adsorbed on the activated carbon fiber nonwoven fabric 9 of the activated carbon fiber nonwoven fabric element 8. The condensate, and the uncondensed water vapor containing the organic solvent component in the gas to be treated are sent to a condenser 17 through a desorption gas line 16, where the uncondensed water vapor containing the organic solvent component in the gas to be treated is condensed. The condensate containing the organic solvent having a higher concentration than that of the condenser 17 is sent to a separator 19. At this time, a lower damper 7 and an upper damper 11 are in a closed state. The gas containing the organic solvent component retained in the separator 19 is returned to a gas to be treated 3 again by a return gas line 20. The organic solvent recovery device in the organic solvent recovery system includes, for example, the condenser 17, a cooling water supply line 18, and the separator 19 in FIG. 2 without limitation.

As the organic solvent adsorption/desorption device, the organic solvent recovery system, the method for adsorbing/desorbing an organic solvent, and the method for recovering an organic solvent of the present invention, known treatment devices, systems, treatment methods, and recovery methods can be employed except that the activated carbon fiber formed body of the present invention is used as an adsorbent, and for example, treatment devices, systems, treatment methods, and recovery methods described in JP-B-6-55254, JP-A-2004-105806, and JP-A-2013-111552 can be employed.

EXAMPLES

Hereinafter, the present invention will be more specifically described with reference to Examples and Comparative Examples, but the present invention is not limited to the following Examples. The evaluation methods of physical properties and the like in the following Examples are as follows.

(1) Amount of Rearrangement Structure in Polyphenylene Ether Component $^1$H-NMR measurement was performed at a resonance frequency of 600 MHz. As a measuring apparatus, an NMR apparatus (apparatus name: AVANCE-NEO600) manufactured by Bruker Corporation was used to perform measurement as follows.

10 mg of each of the formed bodies (samples) obtained in Examples and Comparative Examples was dissolved in deuterated chloroform, and the solution was then filled in an NMR tube within 2 hours to perform measurement. Deuterated chloroform was used as a lock solvent. A waiting time was set to 1 second; a data capture time was set to 4 seconds, and the number of times of integration was set to 64.

Deuterated benzene may be used as the solvent.

The amount of a rearrangement structure was analyzed as follows.

A peak integral value of peaks derived from protons of $R^1$ and $R^2$ groups at the 3 and 5 positions of polyphenylene ether and a peak integral value of peaks derived from protons of a divalent group (methylene group or the like) represented by $R^{3'}$ in a rearrangement structure were respectively defined as A and B, and the amount of the rearrangement structure was determined by the following formula.

Amount of rearrangement structure (mol%)=(B/(A+B))×100

(2) Amount of Radicals in Polyphenylene Ether Component

An amount of radicals was measured under the following conditions using an electron spin resonance apparatus (ESR apparatus) (apparatus name: JES-FA100) manufactured by JOEL Ltd. About 0.1 g of a sample was packed so that the bulk density of the sample was 0.1 to 0.2 g/cm$^3$. However, when the bulk density does not fall within the range of 0.1 to 0.2 g/cm$^3$ or more. In order to quantify the amount of radicals, a manganese marker was simultaneously measured. The amount of radicals was determined from the following formula.

Normalized Intensity of Sample C=Signal Intensity of Sample (−)/Manganese Intensity (−)

Normalized Intensity of Sample D=Signal Intensity of Blank (−)/Manganese Intensity (−)

Amount of Radicals (g$^{-1}$)=(C−D)/Weight of Sample (g)

The signal intensities of the sample and blank were two-time integrated values in a range of 322.1 to 329.3 mT, and the signal intensity of manganese of a manganese marker was a two-time integrated value in a range of 320 to 322 mT. The signal intensity of the blank here is signal intensity measured in a state where no sample is added to the ESR apparatus.

(3) Glass Transition Temperature

Using a differential scanning calorimeter (Model: DSC-Q100) manufactured by TA Instruments, 2 mg of a formed body (fiber) was measured at a temperature increasing rate of 10° C./min from 30° C. to 250° C. in a nitrogen atmosphere, and a temperature at an intersection of an extended line of a baseline lower than or equal to a glass transition temperature and a tangent indicating maximum inclination in a transition portion was defined as the glass transition temperature (Tg).

(4) Fiber Diameter

The fiber diameters were determined by observing a microscopic image using a scanning electron microscope (product name: SU1510, manufactured by Hitachi High-Technologies Corporation), reading the fiber diameters of 100 or more fibers from the microscopic image, and averaging the read fiber diameters. The fiber diameter means a diameter of a fiber.

(5) Width Shrinkage Ratio After Carbonization and Activation Treatments

The sample was cut into a 10 cm square, subjected to carbonization and activation treatments. Then, shrinkage ratios of sizes in a machine direction and a transverse direction were measured, and an average value thereof was calculated.

(6) Weight Yield After Carbonization and Activation Treatments

A polyphenylene ether fiber nonwoven fabric was vacuum-dried at 130° C. for 12 hours, and weighed. A dry weight E before carbonization and activation treatments was measured. After the carbonization and activation treatments, the polyphenylene ether fiber nonwoven fabric was vacuum-dried again at 130° C. for 12 hours, and weighed. A dry weight F after carbonization and activation treatments was measured. The weight yield was determined by the following formula.

Weight yield (% by weight)=(F/E)×100

(7) BET Specific Surface Area 30 mg of a sample was collected, dried under vacuum at 130° C. for 12 hours, weighed, and measured using an automatic specific surface area measuring device GEMINI VII2390 (manufactured by Micromeritics). The adsorption amount of nitrogen gas at the boiling point (−195.8° C.) of liquid nitrogen was measured at a relative pressure in the range of 0.02 to 0.95 to prepare an adsorption isotherm of the sample. Based on the results when the relative pressure was in the range of 0.02 to 0.15, a BET specific surface area (m$^2$/g) per weight was determined by the BET method.

(8) Tensile Strength

In the case of an activated carbon fiber formed body, a test piece having a width of 25 mm and a length of 100 mm was sampled, and breaking strength was measured at a distance between chucks of 50 mm and a tensile speed of 20 mm/min. The tensile strength of the rest piece was calculated by dividing the value by the cross-sectional area (width×thickness) of the test piece (unit: N/cm$^2$). The thickness was measured using a disk having an area of 4 cm$^2$ under a load of 15 gf/cm$^2$ applied to the activated carbon fiber formed body. Of the average value of the tensile strengths of the test pieces cut out in the transverse direction and the average value of the tensile strengths of the test pieces cut out in the longitudinal direction, a smaller value was defined as the tensile strength of the activated carbon fiber nonwoven fabric.

(9) Basis Weight

The sample was vacuum-dried at 130° C. for 12 hours. Then, the mass of the sample per unit area was measured, and determined in a unit of g/m$^2$.

(10) Pressure Loss Coefficient

The activated carbon fiber formed body was cut into a circle having a diameter of 27 mm, and filled into a cylindrical tube having an inner diameter of 27 mm while applying a load such that the activated carbon fiber formed body had a thickness of 30 mm and a packing density of 100 kg/m$^3$. Air having a temperature of 25° C. and a relative humidity of 50% RH was supplied to the cylindrical tube at a linear velocity of 30 cm/sec, and the static pressure difference (mmAq) between the primary side and the secondary side of the filled nonwoven fabric was measured. The pressure loss coefficient (mmAq·s/cm$^2$) of the nonwoven fabric was obtained from the obtained static pressure difference by the following formula.

Pressure loss coefficient(mmAq·s/cm$^2$)=pressure loss (mmAq)/linear velocity(cm/s)/thickness(cm)

(11) Measurement of Concentration of Harmful Gas in Combustion Gas

A decomposition gas generated when the polyphenylene ether fiber, the infusibilized polyphenylene ether fiber, the polyphenylene ether fiber formed body, or the infusibilized polyphenylene ether fiber formed body were carbonized and activated was directly combusted at 700° C. by a combustion apparatus, and the combustion gas was discharged. Concentrations of hydrogen cyanide (HCN) and nitrogen oxide (NO+NO$_2$) in the combustion gas were measured with a Drager detector tube.

(12) Peripheral Speed of Screw

The peripheral speed of a screw was obtained by the following formula.

Peripheral speed of screw (m/min)=diameter of screw (mm)×0.00314×rotation speed of screw (rpm)

Example 1

Poly(2,6-dimethyl-1,4-phenylene ether) (PPO (registered trademark) 640 manufactured by SABIC Innovative Plastics, glass transition temperature (Tg): 221° C.) was extruded using a twin screw extruder (product name: KZW15TW-30MG) manufactured by Technovel corporation at 300° C. The rotation speed of a screw was set to 700 rpm to set the peripheral speed of the screw to 33.0 m/min. A gear pump was installed downstream of the extruder to measure the discharge speed of the polymer, and the polymer was extruded to a nozzle (nozzle width: 300 mm) maintained at 320° C. The polymer discharged from the nozzle was received by a collector having a width of 400 mm, and then fused by a heating roller at 210° C. to obtain a long fiber sheet. The basis weight of the long fiber sheet was 60 g/m². The obtained five long fiber sheets were stacked, and subjected to a front and back treatment with a needle punch machine under conditions of a needle density of 75 needles/cm², a needle depth of 12 mm (front), and 7 mm (back) to obtain a long fiber nonwoven fabric. The obtained long fiber nonwoven fabric was heat-treated at 200° C. for 2 hours in air, then heated to 280° C., and heat-treated at 280° C. for 0.5 hours in air. Subsequently, a carbonization treatment was performed at 900° C. for 1 hour in nitrogen, and then an activation treatment was performed at 900° C. for 1 hour in nitrogen in the presence of 11 vol.% water vapor to obtain an activated carbon fiber nonwoven fabric. The evaluation results of the obtained activated carbon fiber nonwoven fabric are shown in Table 1.

Examples 2 and 3

Activated carbon fiber nonwoven fabrics were obtained in the same manner as in Example 1 except that the rotation speed of a screw and the peripheral speed of the screw were changed as shown in Table 1. The evaluation results of the obtained activated carbon fiber nonwoven fabric are shown in Table 1.

Example 4

Poly(2,6-dimethyl-1,4-phenylene ether) (PPO (registered trademark) 640, glass transition temperature (Tg): 221° C., manufactured by SABIC Innovative Plastic) was extruded at 300° C. using a twin screw extruder (product name: KZW15TW-30MG) manufactured by Technovel corporation. The rotation speed of a screw was set to 700 rpm to set the peripheral speed of the screw to 33.0 m/min. A gear pump was installed downstream of the extruder to measure the discharge speed of the polymer, and the polymer was extruded to a nozzle maintained at 320° C. The polymer discharged from the nozzle was wound up to obtain a polyphenylene ether fiber. The obtained polyphenylene ether fiber was cut to a length of 70 mm, and then subjected to a front and back treatment under conditions of a needle density of 100 needles/cm², and needle depths of 12 mm (front) and 7 mm (back) by a needle punch machine, thereby obtaining a short fiber nonwoven fabric. The obtained short fiber nonwoven fabric was heat-treated at 200° C. for 2 hours in the air, then heated to 280° C., and heat-treated at 280° C. for 0.5 hours in air. Subsequently, a carbonization treatment was performed at 900° C. for 1 hour in nitrogen, and then an activation treatment was performed at 900° C. for 1 hour in nitrogen in the presence of 11 vol.% water vapor to obtain an activated carbon fiber nonwoven fabric. The evaluation results of the obtained activated carbon fiber nonwoven fabric are shown in Table 1.

Comparative Example 1

Poly(2,6-dimethyl-1,4-phenylene ether) (PPO (registered trademark) 640, glass transition temperature (Tg): 221° C., manufactured by SABIC Innovative Plastic) was dissolved in N-methyl-2-pyrrolidone to obtain an undiluted solution containing 20% by mass of poly(2,6-dimethyl-1,4-phenylene ether). The obtained undiluted solution was extruded from a spinning nozzle into water by a wet spinning method, and wound up to obtain a polyphenylene ether ether fiber. The obtained polyphenylene ether fiber was cut to a length of 70 mm, and then subjected to a front and back treatment under conditions of a needle density of 100 needles/cm², and needle depths of 12 mm (front) and 7 mm (back) by a needle punch machine, thereby obtaining a short fiber nonwoven fabric. The obtained short fiber nonwoven fabric was heat-treated at 200° C. for 2 hours in air, then heated to 280° C., and heat-treated at 280° C. for 0.5 hours in air. Subsequently, a carbonized treatment was performed at 900° C. for 1 hour in nitrogen, and then an activation treatment was performed at 900° C. for 1 hour in nitrogen in the presence of 11 vol.% water vapor to obtain and activated carbon fiber nonwoven fabric. The obtained activated carbon fiber nonwoven fabric had a large width shrinkage ratio, and was remarkably deformed. The fibers were remarkably fused with each other, and the flexibility of the activated carbon fiber nonwoven fabric was extremely low. Furthermore, the weight yield after carbonization and activation was also low.

Comparative Example 2

Phenolic fibers having a fiber length of 70 mm (Kynol, manufactured by Gun-Ei Chemical Industry Co., Ltd.) were subjected to a front and back treatment with a needle punch machine under conditions of a needle density of 100 needles/cm², and needle depths of 12 mm (front) and 7 mm (back) to obtain a short fiber nonwoven fabric. The Kynol used contains behenic acid amide in an amount of 5% by mass. The evaluation results of the obtained short fiber nonwoven fabric are shown in Table 1. Furthermore, the obtained short fiber nonwoven fabric was subjected to a carbonization treatment at 900° C. for 1 hour in nitrogen, and then subjected to an activation treatment at 900° C. for 1 hour in nitrogen in the presence of 11 vol.% water vapor to obtain an activated carbon fiber nonwoven fabric. A combustion gas generated during carbonization or activation contained harmful decomposition gases (HCN, NOx).

TABLE 1

| Raw material | | Example 1 Polyphenylene ether | Example 2 Polyphenylene ether | Example 3 Polyphenylene ether | Example 4 Polyphenylene ether | Comparative Example 1 Polyphenylene ether | Comparative Example 2 Phenol resin |
|---|---|---|---|---|---|---|---|
| Rotation of speed of screw | (rpm) | 700 | 450 | 150 | 700 | — | — |
| Peripheral speed of screw | (m/min) | 33.0 | 21 | 7.1 | 33.0 | — | — |
| Fiber diameter of polyphenylene ether fiber | (μm) | 48 | 48 | 48 | 45 | 49 | 35 |

TABLE 1-continued

| | Raw material | | Example 1 Polyphenylene ether | Example 2 Polyphenylene ether | Example 3 Polyphenylene ether | Example 4 Polyphenylene ether | Comparative Example 1 Polyphenylene ether | Comparative Example 2 Phenol resin |
|---|---|---|---|---|---|---|---|---|
| | Felt shape | — | Long fiber | Long fiber | Long fiber | Short fiber | Short fiber | Short fiber |
| | Basis weight of polyphenylene ether fiber | (g/m$^2$) | 305 | 300 | 297 | 272 | 280 | 430 |
| | Glass transition temperature of polyphenylene ether fiber | (° C.) | 204 | 208 | 208 | 204 | 214 | — |
| | Amount of rearrangement structure of polyphenylene ether fiber | (mol %) | 2.8 | 0.8 | 0.1 | 2.7 | No peak | — |
| | Amount of radicals of polyphenylene ether fiber | (g$^{-1}$) | 410 | 260 | 180 | 450 | 24 | — |
| | Width shrinkage ratio after carbonization and activation | (%) | 28 | 30 | 32 | 29 | 51 | 26 |
| | Fusion and deformation of fibers after carbonization and activation | — | Absent | Absent | Absent | Absent | Absent | Absent |
| | Weight yield after carbonization and activation | (% by weight) | 35 | 35 | 33 | 36 | 28 | 34 |
| Concentration in combustion gas during carbonization | HCN | (ppm) | Absent | Absent | Absent | Absent | Absent | 3 |
| | NOx | (ppm) | Absent | Absent | Absent | Absent | Absent | 3 |
| Structure and properties of activated carbon fiber nonwoven fabric | BET specific surface area | (m$^2$/g) | 1450 | 1430 | 1490 | 1430 | 1480 | 1490 |
| | Fiber diameter | (μm) | 33 | 33 | 32 | 32 | 37 | 24 |
| | Basis weight | (g/m$^2$) | 195 | 205 | 220 | 180 | 337 | 200 |
| | Tensile strength | (N/cm$^2$) | 5.88 | 5.13 | 4.70 | 5.65 | 2.70 | 5.40 |
| | Pressure loss coefficient | (mmAq · s/cm$^2$) | 0.32 | 0.33 | 0.34 | 0.33 | 0.40 | 0.60 |

The activated carbon fiber of each of Examples 1 to 4 has a larger fiber diameter than that of the activated carbon fiber of Comparative Example 2. Furthermore, the activated carbon fiber is excellent in mechanical strength and thus excellent in processability. The activated carbon fiber of Comparative Example 2 contains harmful decomposition gases (HCN and NOx) in the combustion gas generated during carbonization and activation, but the activated carbon fiber of each of Examples 1 to 4 does not contain a harmful decomposition gas in the combustion gas generated during carbonization and activation. The activated carbon fiber nonwoven fabric of each of Examples 1 to 4 has a larger fiber diameter and a smaller pressure loss coefficient than those of the activated carbon fiber nonwoven fabric of Comparative Example 2, and thus can be suitably used for applications such as a filter. The activated carbon fiber nonwoven fabric of Comparative Example 1 had a small amount of a rearrangement structure in the polyphenylene ether fiber, and therefore had a large width shrinkage ratio, and was remarkably deformed. The fibers were remarkably fused with each other, and the flexibility of the activated carbon fiber nonwoven fabric was low. Furthermore, the weight yield after carbonization and activation was also low.

Industrial Applicability

The activated carbon fiber of the present invention can be suitably used as an activated carbon fiber having excellent adsorption performance and physical properties in place of the phenolic activated carbon fiber.

Description of Reference Signs

1: Organic solvent recovery system
2A: Adsorption tank
2B: Adsorption tank
3: Solvent mixed gas containing an organic solvent (gas to be treated)
4: Prefilter
5: Blower
6: Lower damper
7: Lower damper
8: Activated carbon fiber nonwoven fabric element
9: Activated carbon fiber nonwoven fabric
10: Upper damper
11: Upper damper
12: Exhaust port
13: Water vapor supply line
14: Automatic valve
15: Automatic valve
16: Desorption gas line
17: Condenser
18: Cooling water supply line
19: Separator
20: Return gas line
22: Organic solvent adsorption/desorption device
101: Hopper
102: Extruder
103: Gear pump
104: Filter material
105: Spinning nozzle
106: Filter
107: Heat-retaining space
108: Introduction of inert gas
109: Heating torch

The invention claimed is:
1. An activated carbon fiber obtained by activating:
a polyphenylene ether fiber that contains a polyphenylene ether component having a rearrangement structure connected by a bond at an ortho-position in a repeating unit continuously bonded at a para-position;
an infusibilized polyphenylene ether fiber obtained by infusibilizing the polyphenylene ether fiber;

a flameproofed polyphenylene ether fiber obtained by flameproofing the polyphenylene ether fiber or the infusibilized polyphenylene ether fiber; or a carbon fiber obtained by carbonizing any of the polyphenylene ether fibers.

2. The activated carbon fiber according to claim 1, wherein:

the repeating unit continuously bonded at a para-position is represented by the following general formula (1):

[Formula 1]

(1)

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent; and the rearrangement structure is represented by the following general formula (2):

[Formula 2]

(2)

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3'}$ represents a divalent group in which one hydrogen atom is removed from $R^3$.

3. The activated carbon fiber according to claim 1, wherein an amount of rearrangement in the polyphenylene ether component having the rearrangement structure is 0.01 mol% or more with respect to all polyphenylene ether structural units in the polyphenylene ether component.

4. The activated carbon fiber according to claim 1, wherein a content of the polyphenylene ether component is 95% by mass or more in the polyphenylene ether fiber.

5. The activated carbon fiber according to claim 1, wherein the rearrangement structure exhibits peaks in a range of 6.8 to 7.0 ppm and a range of 3.8 to 4.0 ppm in nuclear magnetic resonance spectrum ($^1$H-NMR) measurement.

6. The activated carbon fiber according to claim 1, wherein an amount of radicals in the polyphenylene ether fiber is 50 $g^{-1}$ or more.

7. The activated carbon fiber according to claim 1, wherein the polyphenylene ether fiber has a glass transition temperature of 190° C. or higher and 210° C. or lower.

8. An activated carbon fiber formed body comprising the activated carbon fiber according to claim 1.

9. The activated carbon fiber formed body according to claim 8, wherein the activated carbon fiber formed body is an activated carbon fiber nonwoven fabric.

10. The activated carbon fiber formed body according to claim 9, wherein the activated carbon fiber nonwoven fabric has tensile strength of 4 $N/cm^2$ or more.

11. A method for producing an activated carbon fiber according to claim 1, comprising the steps of:

producing a polyphenylene ether fiber that contains a polyphenylene ether component having a rearrangement structure connected by a bond at an ortho-position in a repeating unit continuously bonded at a para-position; and activating the polyphenylene ether fiber.

12. A method for producing an activated carbon fiber according to claim 1, comprising the steps of:

producing a polyphenylene ether fiber that contains a polyphenylene ether component having a rearrangement structure connected by a bond at an ortho-position in a repeating unit continuously bonded at a para-position;

infusibilizing the polyphenylene ether fiber to produce an infusibilized polyphenylene ether fiber; and activating the infusibilized polyphenylene ether fiber.

13. A method for producing an activated carbon fiber according to claim 1, comprising the steps of:

producing a polyphenylene ether fiber that contains a polyphenylene ether component having a rearrangement structure connected by a bond at an ortho-position in a repeating unit continuously bonded at a para-position;

flameproofing the polyphenylene ether fiber to produce a flameproofed polyphenylene ether fiber; and activating the flameproofed polyphenylene ether fiber.

14. A method for producing an activated carbon fiber according to claim 1, comprising the steps of:

producing a polyphenylene ether fiber that contains a polyphenylene ether component having a rearrangement structure connected by a bond at an ortho-position in a repeating unit continuously bonded at a para-position;

infusibilizing the polyphenylene ether fiber to produce an infusibilized polyphenylene ether fiber;

flameproofing the infusibilized polyphenylene ether fiber to produce a flameproofed polyphenylene ether fiber; and activating the flameproofed polyphenylene ether fiber.

15. A method for producing an activated carbon fiber formed body according to claim 8, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body; and activating the polyphenylene ether fiber formed body.

16. A method for producing an activated carbon fiber formed body according to claim 8, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

infusibilizing the polyphenylene ether fiber formed body to produce an infusibilized polyphenylene ether fiber formed body; and activating the infusibilized polyphenylene ether fiber formed body.

17. A method for producing an activated carbon fiber formed body according to claim 8, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

flameproofing the polyphenylene ether fiber formed body to produce a flameproofed polyphenylene ether fiber formed body; and activating the flameproofed polyphenylene ether fiber formed body.

18. A method for producing an activated carbon fiber formed body according to claim 8, comprising the steps of:

processing a polyphenylene ether fiber that contains a polyphenylene ether component having a rearrangement structure connected by a bond at an ortho-position in a repeating unit continuously bonded at a para-position to produce a polyphenylene ether fiber formed body;

infusibilizing the polyphenylene ether fiber formed body to produce an infusibilized polyphenylene ether fiber formed body;

flameproofing the infusibilized polyphenylene ether fiber formed body to produce a flameproofed polyphenylene ether fiber formed body; and activating the flameproofed polyphenylene ether fiber formed body.

19. An organic solvent adsorption/desorption device that cleans a gas to be treated by adsorbing and removing an organic solvent from the gas to be treated containing the organic solvent, and desorbs the adsorbed organic solvent, the device comprising:

an adsorption tank filled with an adsorbent that adsorbs the organic solvent by bringing the gas to be treated into contact with the adsorbent, and desorbs the adsorbed organic solvent by bringing water vapor or a heating gas into contact with the adsorbent, wherein the adsorbent contains the activated carbon fiber formed body according to claim 8.

20. An organic solvent recovery system comprising:

the organic solvent adsorption/desorption device according to claim 19; and an organic solvent recovery device that condenses a desorption gas discharged from the organic solvent adsorption/desorption device to recover an organic solvent.

* * * * *